United States Patent
Okayama et al.

(10) Patent No.: US 9,831,786 B2
(45) Date of Patent: Nov. 28, 2017

(54) SWITCHING POWER-SUPPLY DEVICE

(71) Applicant: Fuji Electric Co., Ltd., Kanagawa (JP)

(72) Inventors: Kenichi Okayama, Nagano (JP); Ichiro Nomura, Nagano (JP)

(73) Assignee: FUJI ELECTRIC CO., LTD., Kanagawa (JP)

(*) Notice: Subject to any disclaimer, the term of this patent is extended or adjusted under 35 U.S.C. 154(b) by 0 days.

(21) Appl. No.: 15/403,054

(22) Filed: Jan. 10, 2017

(65) Prior Publication Data
US 2017/0149341 A1 May 25, 2017

Related U.S. Application Data

(63) Continuation of application No. PCT/JP2016/051085, filed on Jan. 15, 2016.

(30) Foreign Application Priority Data

Jan. 16, 2015 (JP) ................... 2015-007287

(51) Int. Cl.
*H02M 3/335* (2006.01)
*H02M 1/08* (2006.01)
*H02M 1/00* (2006.01)

(52) U.S. Cl.
CPC ......... *H02M 3/33553* (2013.01); *H02M 1/08* (2013.01); *H02M 2001/0009* (2013.01); *H02M 2001/0054* (2013.01)

(58) Field of Classification Search
CPC ............. H02M 3/335; H02M 3/33569; H02M 3/33507; H02M 3/315; H02M 2007/4815;
(Continued)

(56) References Cited

U.S. PATENT DOCUMENTS 6,049,471 A * 4/2000 Korcharz .......... H02M 3/33515
                                                         363/20
6,166,926 A * 12/2000 Nath .................... H02M 3/3385
                                                         363/21.03
(Continued)

FOREIGN PATENT DOCUMENTS

EP   3 018 810 A1   5/2016
JP   2002-209381 A  7/2002
(Continued)

OTHER PUBLICATIONS

International Search Report (ISR) issued in PCT/JP2016/051085 dated Apr. 2016.
(Continued)

*Primary Examiner* — Adolf Berhane
(74) *Attorney, Agent, or Firm* — Chen Yoshimura LLP

(57) ABSTRACT

A switching power-supply device includes an input power detecting part that finds a DC input power from a detected DC input voltage and a detected DC input current, and an operation mode setting part that sets a burst mode operation or a continuous mode operation based on the DC power detected by the input power detecting part. The operation mode setting part also may set a ratio of a switching active period Tact, in which the main switching element is caused to perform switching operations, to a switching stop period Tstop, in which the switching operations are stopped, in the case of the burst mode operation in accordance with the detected input power.

12 Claims, 18 Drawing Sheets

(58) Field of Classification Search
CPC ......... H02M 2007/4818; H02M 1/083; H02M 7/148
USPC ..... 363/20, 21.01, 21.02, 21.03, 95, 97, 131
See application file for complete search history.

(56) References Cited

U.S. PATENT DOCUMENTS

| | | | |
|---|---|---|---|
| 6,483,722 B2 | 11/2002 | Nozawa et al. | |
| 6,515,876 B2 | 2/2003 | Koike et al. | |
| 8,736,237 B2 | 5/2014 | Orr | |
| 9,716,437 B2* | 7/2017 | Hwang | H02M 3/33507 |
| 2004/0120171 A1* | 6/2004 | Choi | H02M 3/33523 363/97 |
| 2005/0024900 A1 | 2/2005 | Hachiya | |
| 2007/0183171 A1* | 8/2007 | Niijima | H02M 3/33507 363/21.04 |
| 2010/0321963 A1 | 12/2010 | Yamashita | |
| 2012/0092900 A1 | 4/2012 | Orr | |
| 2016/0181934 A1* | 6/2016 | Kikuchi | H02M 3/33523 363/21.14 |
| 2016/0294273 A1* | 10/2016 | Kawamura | H02M 3/33523 |
| 2016/0329846 A1 | 11/2016 | Shimomugi et al. | |

FOREIGN PATENT DOCUMENTS

| | | |
|---|---|---|
| JP | 3371962 B2 | 1/2003 |
| JP | 3426570 B2 | 7/2003 |
| JP | 2005-65481 A | 3/2005 |
| JP | 2011-4550 A | 1/2011 |
| JP | 2012-85523 A | 4/2012 |
| WO | 2015/002249 A1 | 1/2015 |

OTHER PUBLICATIONS

Written Opinion (PCT/ISA/237) issued in PCT/JP2016/051085 dated Apr. 2016. (Concise Explanation of Relevance: This Written Opinion considers that the claims are not described by or obvious over the references Nos. 2-5 cited in ISR above.).

English translation of Written Opinion (PCT/ISA/237) issued in PCT/JP2016/051085 dated Apr. 2016.

* cited by examiner

SWITCHING POWER-SUPPLY DEVICE

BACKGROUND OF THE INVENTION

Technical Field

The present invention relates to a switching power-supply device that with a simple configuration is capable of suppressing wasteful loss and achieving higher efficiency in a wide range of load states, particularly light load states.

Background Art

A switching power-supply device generally includes a main switching element that controls current flowing in a primary coil of a transformer to which a DC input voltage is applied, and a voltage output circuit that generates a prescribed DC output voltage by rectifying and smoothing a voltage induced in a secondary coil of the transformer. The switching power-supply device is furthermore configured to include a switching control circuit for controlling the main switching element on/off in response to the input of a feedback signal based on the DC output voltage, thereby making the DC output voltage constant.

Switching power-supply devices can be roughly divided into self-excited and separately-excited types. The self-excited switching power-supply device is a type in which an on/off period of the main switching element is determined by a switching circuit portion itself performing oscillation operations. Meanwhile, the separately-excited switching power-supply device is a type in which an oscillator that determines the on/off period of the main switching element is provided externally.

Additionally, the circuit types of switching power-supply devices include a forward type and a flyback type, which have different ways of transmitting energy through a transformer. The forward type is a type that generates the DC output voltage by transmitting energy to the secondary coil side through the transformer when the main switching element is turned on. The flyback type, meanwhile, is a type that generates the DC output voltage by transmitting energy to the secondary coil side through the transformer when the main switching element is turned off.

Meanwhile, current flowing in the main switching element or a voltage applied to the main switching element is also set to a sinusoidal shape in order to reduce loss in the main switching element. Such a switching power-supply device is referred to as a current resonance-type switching power-supply device or a voltage resonance-type switching power-supply device. Incidentally, the current resonance-type switching power-supply device is provided with a resonance capacitor connected in series to the primary coil of the transformer, and controls the main switching element on/off at the timing when current flowing in the main switching element becomes zero (0). Meanwhile, the voltage resonance switching power-supply device is provided with a resonance capacitor connected in parallel to the main switching element, and controls the main switching element on/off at the timing when a voltage applied to the main switching element becomes zero (0).

Specifically, the current resonance-type switching power-supply device is configured as illustrated in FIG. 14, for example. In this switching power-supply device, two switching elements Q1 and Q2 connected in series are used as main switching elements. The switching element Q1 is connected in parallel to a primary coil P of a transformer T via a resonance capacitor Cr, and the switching element Q2 is connected in series to the primary coil P of the transformer T. The switching elements Q1 and Q2 are constituted of MOS-FETs, for example, and are generally turned on/off complementarily in response to a gate signal from a control circuit CONT implemented as an integrated circuit.

A DC input voltage Vin is applied to the primary coil P of the transformer T from a DC power source BAT, via the resonance capacitor Cr and the switching element Q2. The DC power source BAT rectifies a commercial AC power supply, for example, to generate the DC input voltage Vin. The DC input voltage Vin is then is smoothed through an input capacitor Cin and applied to the switching power-supply device.

Here, the switching element Q2 serves to supply current Icr to the primary coil P of the transformer T via the resonance capacitor Cr when on, and store energy in a resonance circuit, constituted of the resonance capacitor Cr and a resonance inductance of the transformer T. The switching element Q1, meanwhile, serves to discharge the energy stored in the resonance circuit through the primary coil P of the transformer T when on, and supply a reverse current Icr to the primary coil P. As a result, the current Icr flowing through the primary coil P of the transformer T has a sinusoidal waveform indicating a resonance arc.

Prescribed voltages are induced in secondary coils S1 and S2 of the transformer T by the current Icr flowing in the primary coil P of the transformer T. The voltages induced in the secondary coils S1 and S2 of the transformer T are subjected to full-wave rectification by diodes D1 and D2, and are then smoothed through an output capacitor Cout. In other words, the diodes D1 and D2 and the output capacitor Cout constitute a voltage output circuit that generates, from the voltage induced in the secondary coils S1 and S2 of the transformer T, a DC output voltage Vout to be supplied to a load RL.

Meanwhile, the DC output voltage Vout undergoes resistance division through resistors R1 and R2 and is detected as a detected voltage Vsens proportional to the DC output voltage Vout. An error voltage between the detected voltage Vsens and a prescribed reference voltage Vref set by a shunt regulator SR is supplied to the control circuit CONT via a photocoupler PC as a feedback signal. The control circuit CONT then makes the DC output voltage Vout constant by subjecting the periods in which the switching elements Q1 and Q2 turn on/off to feedback control on the basis of the feedback signal. A switching power-supply device configured in this manner is described in detail in, for example, Patent Document 1 and the like.

RELATED ART DOCUMENT

Patent Document

Patent Document 1: Japanese Patent Application Laid-Open Publication No. 2002-209381

SUMMARY OF THE INVENTION

Incidentally, the above-described switching power-supply device is designed such that when the load is 100%, which is the rated load of the device, the current Icr flowing in the primary coil P of the transformer T becomes substantially sinusoidal and an efficiency η becomes maximum in accordance with the switching elements Q1 and Q2 being turned on/off complementarily, as indicated in the operation waveform illustrated in FIG. 15, for example. Note that in FIG. 15, drain currents Id1 and Id2, gate signals Vgate1 and Vgate2, and source-drain voltages Vds1 and Vds2 of the switching elements Q1 and Q2, which are involved in the switching operations, are each indicated together.

As opposed to this, at 25% load, a peak value of the current Icr is much lower than at 100% load, and a waveform of the current Icr flowing in the primary coil P of the transformer T becomes a sawtooth wave in which parts of sine waves are combined in an alternating manner, as indicated by the operation waveform illustrated in FIG. 16, for example. Meanwhile, peak values of drain currents I1 and I2 of the switching elements Q1 and Q2 at this time are much lower than at 100% load, as indicated by the enlargement indicated in FIG. 17.

However, even at 25% load, an excitation current itself of the transformer T is almost the same as in a situation of 100% load, as indicated by the broken line in FIG. 17. This excitation current is what is known as reactive current in the switching power-supply device, and causes loss due to impedance of the circuit constituting the switching power-supply device. As such, the efficiency η at 25% load drops to approximately 90%, compared to the efficiency η (95%) at 100% load, as indicated in FIG. 18, for example. In other words, there is a problem in that even if the switching power-supply device is designed such that the efficiency η becomes maximum at the rated load, the efficiency η will drop at light loads.

As a method for ameliorating such drops in efficiency at light loads, the on/off operations of the switching elements Q1 and Q2 are performed intermittently with a prescribed pause period provided therebetween at light loads, which reduces switching loss and conduction loss. Specifically, an external device (not illustrated) supplies an operation mode switching signal based on the load state to the control circuit CONT. Under the control of the control circuit CONT, the switching elements Q1 and Q2 are turned on/off continuously (a continuous operation mode) at the rated load, or the switching elements Q1 and Q2 are turned on/off intermittently (an intermittent operation mode) at light loads. As a result, switching loss and the like in the switching elements Q1 and Q2 during the pause period of the on/off operations of the switching elements Q1 and Q2 are eliminated, which prevents the overall efficiency η from dropping at light loads.

However, because the operation mode switching signal is supplied from the external device as described above, the switching power-supply device requires an interface circuit or the like for inputting the operation mode switching signal. This poses a new problem in that the number of components constituting the switching power-supply device increases, which leads to increased costs. Additionally, in a switching power-supply device to which the operation mode switching signal cannot be inputted from the exterior, there is a problem in that the operation of switching the operation mode itself cannot be carried out.

Accordingly, for example, it is conceivable to detect a load current by interposing a load detecting resistor (shunt resistor) at the DC output voltage Vout output end, and selectively switch between the continuous operation mode and the intermittent operation mode in accordance with the detected load current. Doing so makes it unnecessary to have the operation mode switching signal supplied from the external device, and thus the number of components constituting the switching power-supply device does not increase. Conversely, however, loss at the load detecting resistor increases greatly at light loads, and thus the effect of improving the efficiency cannot be achieved at light loads.

Having been made in view of the above circumstances, it is an object of the present invention to provide a switching power-supply device that with a simple configuration is capable of suppressing wasteful loss and achieving higher efficiency, particularly in light load states, from a 10% load state to a 100% load state, for example. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power-supply device, including a switching power-supply main unit that receives a DC input voltage from a DC source and converts the DC input voltage to a DC output voltage, the switching power-supply main unit including: a transformer having a primary coil and a secondary coil; a main switching element that controls a current flowing in the primary coil of the transformer; and a voltage output circuit that generates a DC output voltage by rectifying a voltage induced in the secondary coil of the transformer; and a switching control circuit that receives a feedback signal representing the DC output voltage and controls a switching operation of the main switching element so as to feedback-control the DC output voltage to be a prescribed constant voltage, wherein the switching control circuit includes: an input power detecting part that detects an input power to the switching power-supply main unit by detecting the DC input voltage and a DC input current flowing from the DC source to the switching power-supply main unit; and an operation mode setting part that determines whether a burst mode operation of the main switching element or a continuous mode operation of the main switching element is to be performed based on the input power detected by the input power detecting part, wherein the burst mode operation has a switching active period during which the main switching element is repeatedly turned on and off and a switching stop period during which the main switching element is not turned on and off, the switching active period and the switching stop period alternating and repeating at a prescribed frequency, and wherein, in the continuous mode operation, the main switching element is repeatedly turned on and off without having the switching stop period.

In another aspect, the present invention provides a switching power-supply device according to one aspect of the present invention basically includes:

a switching power-supply main unit having a main switching element that controls a current flowing in a primary coil of a transformer to which a DC input voltage is applied, and a voltage output circuit that generates a prescribed DC output voltage by rectifying a voltage induced in a secondary coil of the transformer; and a switching control circuit that takes a feedback signal based on the DC output voltage as an input and makes the DC output voltage constant by controlling a switching frequency at which the main switching element is turned on/off.

The switching power-supply main unit and the switching control circuit in this switching power-supply device may form a current resonance switching power-supply circuit unit or a voltage resonance-type switching power-supply circuit unit.

A particular feature of the switching power-supply device according to one aspect of the present invention is that the switching control circuit is provided with:

an input power detecting part that finds an input power to the switching power-supply main unit by detecting the DC input voltage and a DC input current supplied to the switching power-supply main unit in response to the application of the DC input voltage; and an operation mode setting part that changes a ratio between a switching active period Tact, in which the main switching element is caused to perform switching operations at the switching frequency, and a switching stop period Tstop, in which the switching operations are stopped, in accordance with the input power found by the input power detecting part.

A switching power-supply device according to another aspect of the present invention basically includes:

a switching power-supply main unit including a main switching element that controls a current flowing in a primary coil of a transformer to which a DC input voltage is applied, and a voltage output circuit that generates a prescribed DC output voltage by rectifying a voltage induced in a secondary coil of the transformer; and a switching control circuit that takes a feedback signal based on the DC output voltage as an input and makes the DC output voltage constant by controlling a duty cycle at which the main switching element is turned on/off.

Incidentally, the switching power-supply main unit and the switching control circuit in this switching power-supply device may form a forward-type switching power-supply circuit unit or a flyback-type switching power-supply circuit unit.

A particular feature of this other switching power-supply device according to one aspect of the present invention is that the switching control circuit is provided with:

an input power detecting part that finds an input power to the switching power-supply main unit by detecting the DC input voltage and a DC input current supplied to the switching power-supply main unit in response to the application of the DC input voltage; and an operation mode setting part that changes a ratio between a switching active period Tact, in which the main switching element is caused to perform switching operations at the duty cycle, and a switching stop period Tstop, in which the switching operations are stopped, in accordance with the input power found by the input power detecting part.

Preferably, in each of the switching power-supply devices, the operation mode setting part sets the ratio between the switching active period Tact and the switching stop period Tstop to a value at which the entirety of a control unit period Tsw (=Tact+Tstop), in which the main switching element is controlled on/off, is only the switching active period Tact, or to a value at which the control unit period Tsw is divided into the switching active period Tact and the switching stop period Tstop.

In particular, in one aspect, the operation mode setting part is configured such that when the input power is at a maximum rating, the operation mode setting part sets the switching stop period Tstop to <0> such that the entirety of the control unit period Tsw is the switching active period Tact, and the operation mode setting part sets the ratio between the switching active period Tact and the switching stop period Tstop such that a percentage of the control unit period Tsw occupied by the switching active period Tact drops as the input power decreases.

Preferably, the percentage of the control unit period Tsw occupied by the switching active period Tact is set so as to decrease in stages as the input power decreases.

A peak value of the current flowing in the primary coil of the transformer when the control unit period Tsw is divided into the switching active period Tact and the switching stop period Tstop may be set to be approximately equal to a peak value of the current flowing in the primary coil of the transformer when the entirety of the control unit period Tsw is the switching active period Tact.

Further, the peak value of the current flowing in the primary coil of the transformer when the entirety of the control unit period Tsw is the switching active period Tact may be a current value at which an efficiency of the switching power-supply main unit generating the DC output voltage from the DC input voltage and outputting the DC output voltage is maximum.

Here, to reduce switching loss resulting from high-speed switching and to improve the efficiency, it is preferable, for example, to form the main switching element, or some or all of elements that rectify the voltage induced in the secondary coil, as elements constituted of wide band-gap semiconductors such as silicon carbide, a gallium nitride-based material, a gallium oxide-based material, or diamond, rather than silicon, which is often used conventionally.

Some aspects of the present invention focuses on the fact that a load power outputted by the switching power-supply device in accordance with the load state is generally proportional to the input power to the switching power-supply device. Accordingly, with the switching power-supply device according to the present invention, the switching control circuit detects a voltage Vin applied to a circuit constituted of the primary coil of the transformer and the main switching element and a current supplied to the switching power-supply main unit in response to the application of the DC input voltage, namely a current Id2 flowing in a switching element Q2 connected in series to the primary coil of the transformer or a current Id1 flowing in a switching element Q1 connected in parallel to the primary coil, for example. An input power Pin to the switching power-supply main unit is then found, and the input power Pin is used as evaluation information of the load state.

Then, the switching control circuit switches a switching operation mode of the main switching element between a continuous operation mode, in which the main switching element is continuously turned on/off, and an intermittent operation mode (or so-called the burst mode operation), in which the main switching element is intermittently turned on/off around the pause period Tstop, in accordance with the input power Pin indicating the load state. This makes it unnecessary to provide an operation mode switching signal from the exterior as is necessary conventionally, and it is thus possible to intermittently turn the main switching element on/off without causing a major increase in costs. Furthermore, it is not necessary to interpose a load detecting resistor (shunt resistor) at an output end of the DC output voltage Vout to detect the load current, which eliminates a problem in which a large degree of loss arises in the load detecting resistor at light loads. It is therefore possible to eliminate drops in efficiency at light loads easily and effectively.

In particular, in the switching power-supply device according to the present invention, the configuration is such that the ratio of the switching active period Tact and the switching stop period Tstop is changed for multiple stages in accordance with the input power Pin. Furthermore, in the switching power-supply device according to the present invention, the peak value of the current flowing in the primary coil of the transformer during the intermittent operation mode is set to be substantially equal to the peak value of the current flowing in the primary coil of the transformer during the continuous operation mode.

As a result, an efficiency η in the switching active period Tact during the intermittent operation mode can be made approximately equal to an efficiency η in the continuous operation mode at the rated load. Furthermore, loss in the switching stop period Tstop during the intermittent operation mode can be brought to substantially zero (0). As such, the efficiency of the switching power-supply device according to the present invention at light loads can be made substantially equal to a maximum efficiency obtained as a time average. An effect such as being able to prevent a drop in the efficiency η can thus be achieved throughout a wide range, from light load states to a maximum load state.

Furthermore, as described earlier, if elements constituted of wide band-gap semiconductors are used as the main switching element, or some or all of elements that rectify the voltage induced in the secondary coil, switching loss can be reduced, which provides an effect of improving the efficiency. It is to be understood that both the foregoing general description and the following detailed description are exemplary and explanatory, and are intended to provide further explanation of the invention as claimed.

DETAILED DESCRIPTION OF EMBODIMENTS

A current resonance type switching power-supply device according to Embodiment 1 of the present invention will be described hereinafter with reference to the drawings.

Figure 1:
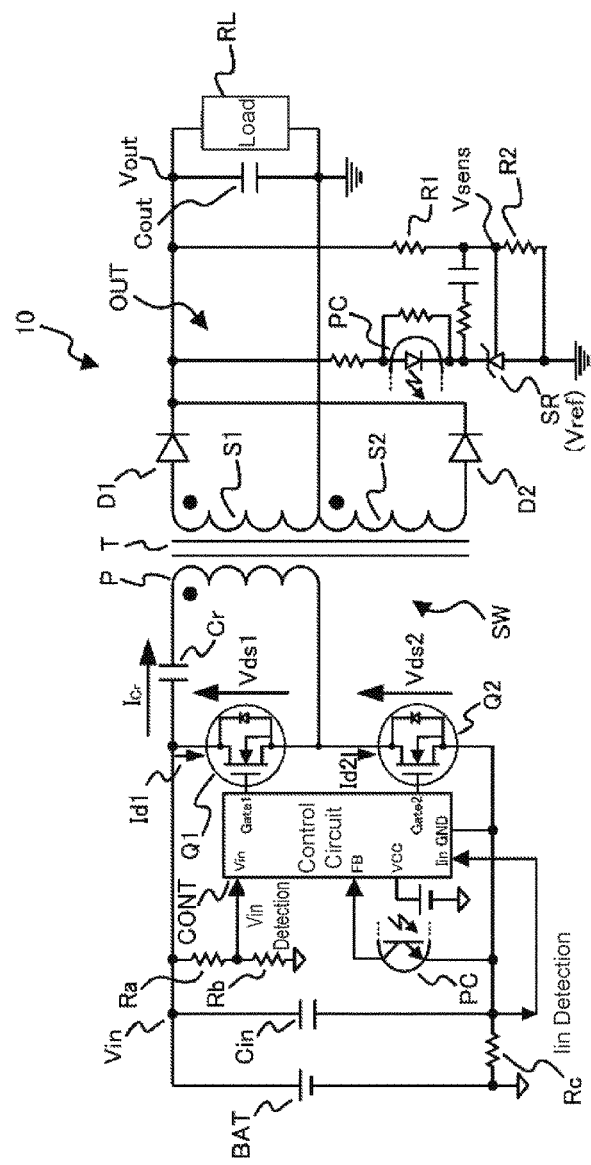
FIG. 1 is an overall schematic diagram illustrating a current resonance-type switching power-supply device according to Embodiment 1 of the present invention.
Figure 14:
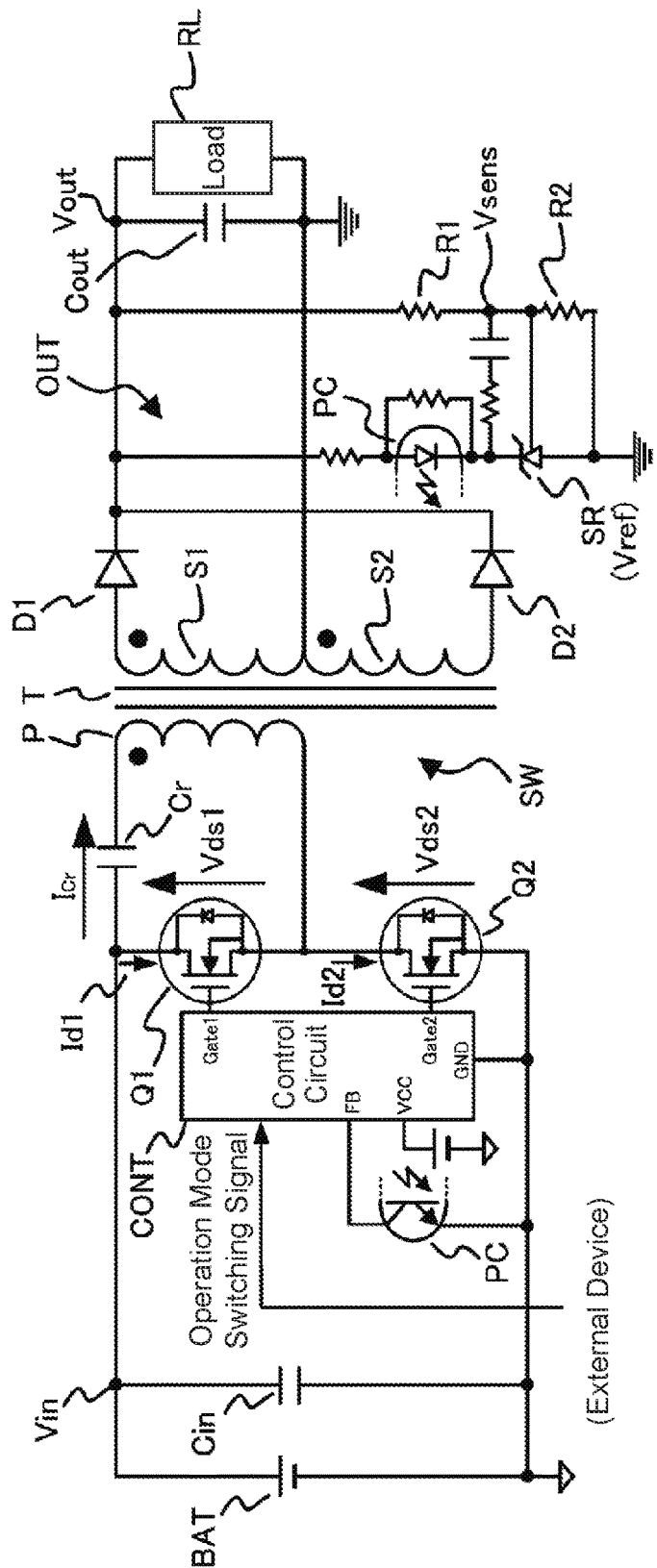
FIG. 14 is a schematic diagram illustrating an example of a conventional current resonance-type switching power-supply device.

FIG. 1 is a diagram illustrating the overall configuration of a switching power-supply device 10 according to Embodiment 1 of the present invention. The switching power-supply device 10 has the same basic configuration as the switching power-supply device illustrated in FIG. 14. Accordingly, constituent elements that are the same as those in the switching power-supply device illustrated in FIG. 14 will be given the same reference numerals, and redundant descriptions thereof will be omitted. Here, a voltage output circuit OUT constituted of switching elements Q1 and Q2 serving as main switching elements, a transformer T, diodes D1 and D2, and an output capacitor Cout forms a switching power-supply main unit SW in the switching power-supply device 10.

A feature of the switching power-supply device 10 according to Embodiment 1 is that the device includes an input voltage detecting unit VD for detecting a DC input voltage Vin applied to the switching power-supply main unit SW by a DC power source BAT, and an input current detecting unit ID for detecting an input current Iin flowing from the DC power source BAT through the switching power-supply main unit SW. The input voltage detecting unit VD is constituted of, for example, resistors Ra and Rb connected in series, and is realized as a resistance voltage division circuit that detects the DC input voltage Vin through resistance division. The input current detecting unit ID, meanwhile, is realized as, for example, a shunt resistor Rc for detecting current, connected in series to a source of the switching element Q2.

An input voltage signal expressing the DC input voltage Vin detected through the resistors Ra and Rb, and an input current signal expressing the input current Iin detected through the shunt resistor Rc, are supplied to a switching control circuit CONT. The switching control circuit CONT finds an input power Pin to be applied to the switching power-supply main unit SW from the DC power source BAT by multiplying the DC input voltage signal by the input current signal.

The input power Pin found in this manner generally corresponds to an output power Pout of the switching power-supply main unit SW. Accordingly, the switching control circuit CONT uses the input power Pin as evaluation information indicating a load state of the switching power-supply device 10, and changes/sets operation modes of the switching elements Q1 and Q2 in accordance with the input power Pin, as will be described later. In other words, the switching power-supply device 10 according to the present invention is configured such that the load state is detected within the switching power-supply device 10, and the operation modes of the switching elements Q1 and Q2 are changed/set in accordance with the detected load state.

Figure 2:
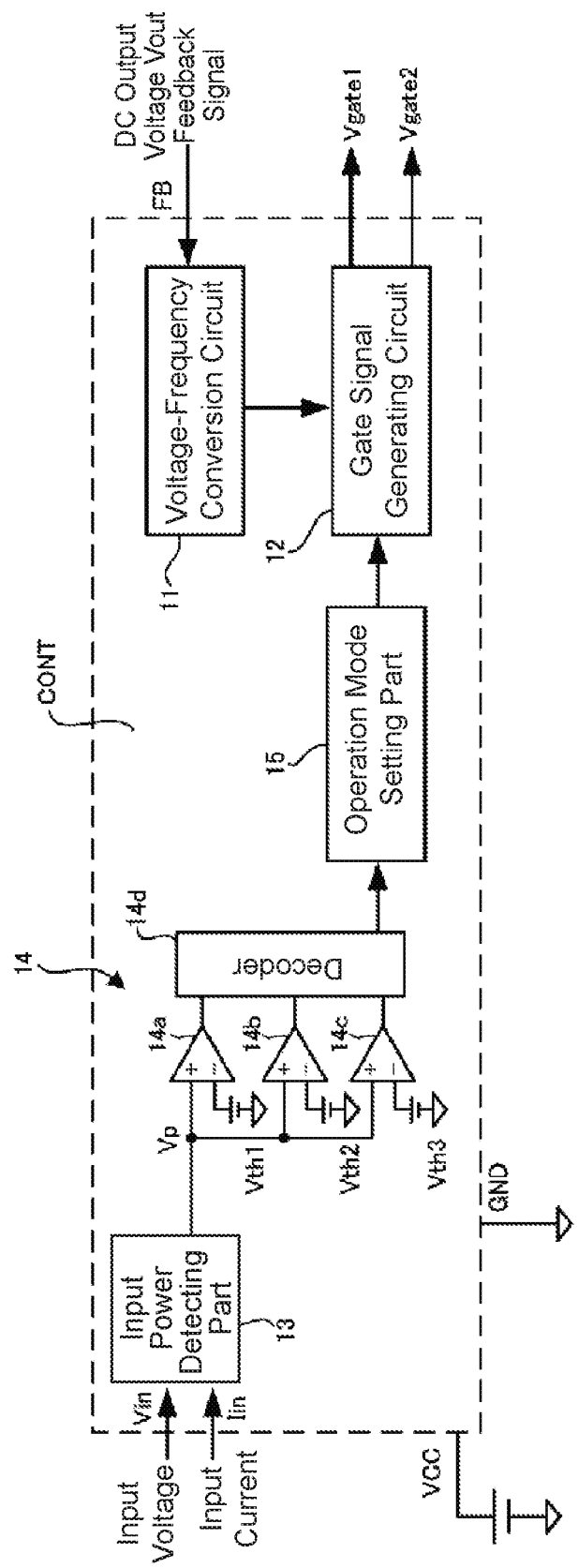
FIG. 2 is a schematic block diagram illustrating main parts of a switching control circuit in the switching power-supply device illustrated in FIG. 1.

FIG. 2 is a schematic block diagram illustrating main parts of the switching control circuit CONT configured to set the operation modes of the switching elements Q1 and Q2 in accordance with the load state detected as described above. The switching control circuit CONT basically includes a voltage-frequency conversion circuit 11 that takes the feedback signal found in accordance with the DC output voltage Vout as an input and finds a switching frequency based on the feedback signal. The feedback signal is an error voltage between a detected voltage Vsens proportional to the DC output voltage Vout and a reference voltage Vref set by a shunt regulator SR, as described above.

The switching control circuit CONT further includes a gate signal generating circuit 12 that, in accordance with the switching frequency fsw found by the voltage-frequency conversion circuit 11, generates gate signals Vgate1 and Vgate2 at a period T (=1/fsw). The gate signals Vgate1 and Vgate2 are signals that complementarily turn the switching elements Q1 and Q2 on/off as described earlier. The DC output voltage Vout is made constant by controlling the period T of the gate signals Vgate1 and Vgate2 in accordance with the feedback signal in this manner.

Figure 3:
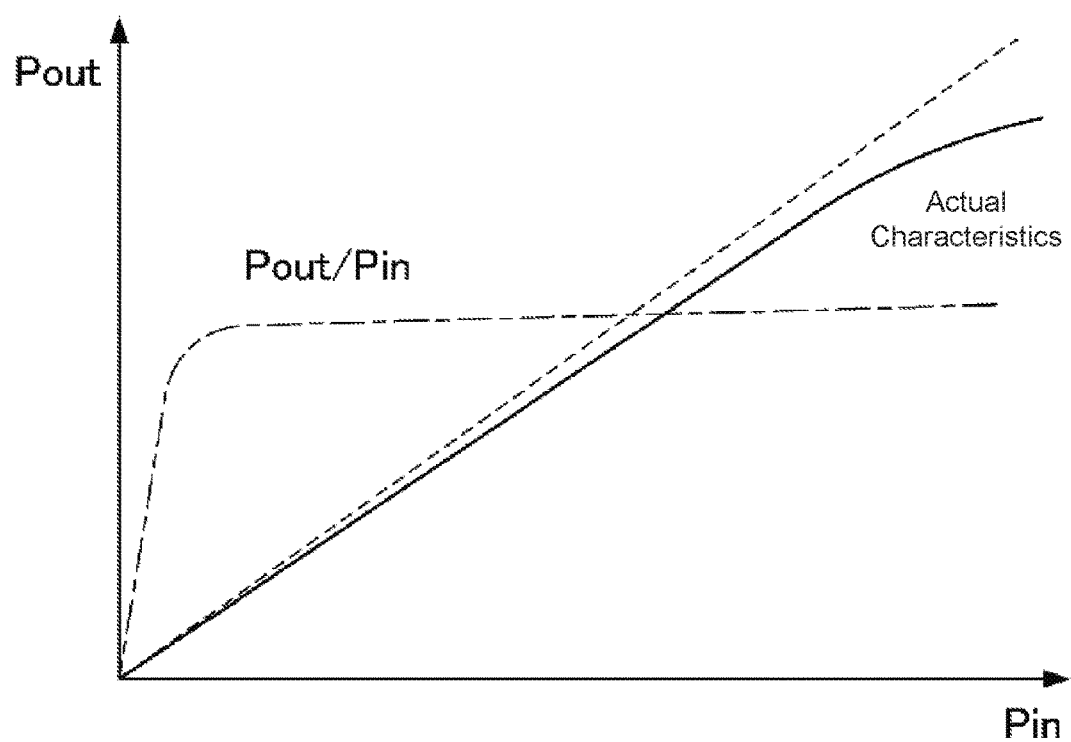
FIG. 3 is a diagram schematically illustrating a relationship between an input power Pin and an output power (load power) Pout.

In addition to such basic functions, the switching control circuit CONT further includes an input power detecting part 13 for finding the input power Pin (=Vin×Iin) from the DC input voltage Vin and the input current Iin. The input power detecting part 13 is constituted of a multiplier that finds a control voltage Vp corresponding to the input power Pin by multiplying the DC input voltage Vin by the input current Iin. Incidentally, as illustrated in FIG. 3, the input power Pin is approximately proportional to the output power Pout of the switching power-supply main unit SW that generates the constant DC output voltage Vout, or in other words, to a load power of the switching power-supply device 10 based on the load state.

Meanwhile, the switching control circuit CONT includes a load state determination unit 14 that determines the load state of the switching power-supply device 10 from the level of the control voltage Vp corresponding to the input power Pin found as described above. This load state determination unit 14 is constituted of, for example, three comparators 14a, 14b, and 14c that detect the load state of the switching power-supply device 10 for four stages, and a decoder 14d for generating an operation mode selection signal based on the respective outputs of the comparators 14a, 14b, and 14c.

The comparators 14a, 14b, and 14c determine the magnitude of the load state by comparing respective threshold voltages Vth1, Vth2, and Vth3, set in advance in accordance with load state levels, with the control voltage Vp. Specifically, the comparators 14a, 14b, and 14c determine whether the load state of the switching power-supply device 10 corresponds to, for example, a 100% load state, a 75% load state, a 50% load state, or a 25% load state. To determine the load states for these four stages, the threshold voltages Vth1, Vth2, and Vth3 set in the comparators 14a, 14b, and 14c, respectively, are provided as voltage values corresponding to, for example, 80% load, 55% load, and 30% load.

Then, when the outputs of the comparators 14a, 14b, and 14c are <HHH (111)>, the decoder 14d determines that the load state of the switching power-supply device 10 exceeds 80% load, or in other words, is in the 100% load state. Meanwhile, when the outputs of the comparators 14a, 14b, and 14c are <LHH (011)>, the decoder 14d determines that the load state of the switching power-supply device 10 exceeds 55% load but does not reach 80% load, or in other words, determines that the load state is 75%.

Likewise, when the outputs of the comparators 14a, 14b, and 14c are <LHH (001)>, the decoder 14d determines that the load state of the switching power-supply device 10 exceeds 30% load but does not reach 55% load, or in other words, determines that the load state is 50%. Furthermore, when the outputs of the comparators 14a, 14b, and 14c are <LLL (000)>, the decoder 14d determines that the load state of the switching power-supply device 10 does not reach 30% load, or in other words, determines that the load state is 25%.

The decoder 14d then outputs, for example, a 2-bit selection signal for selectively setting switching operation modes of the switching elements Q1 and Q2 according to the above-described determination result for the four stages of the load state. By controlling the operation of the gate signal generating circuit 12 in accordance with the selection signal outputted from the decoder 14d, an operation mode setting part 15 included in the switching control circuit CONT serves to selectively set the operation mode for turning the switching elements Q1 and Q2 on/off in the period T to one of four types of operation modes set in advance.

Figure 4:
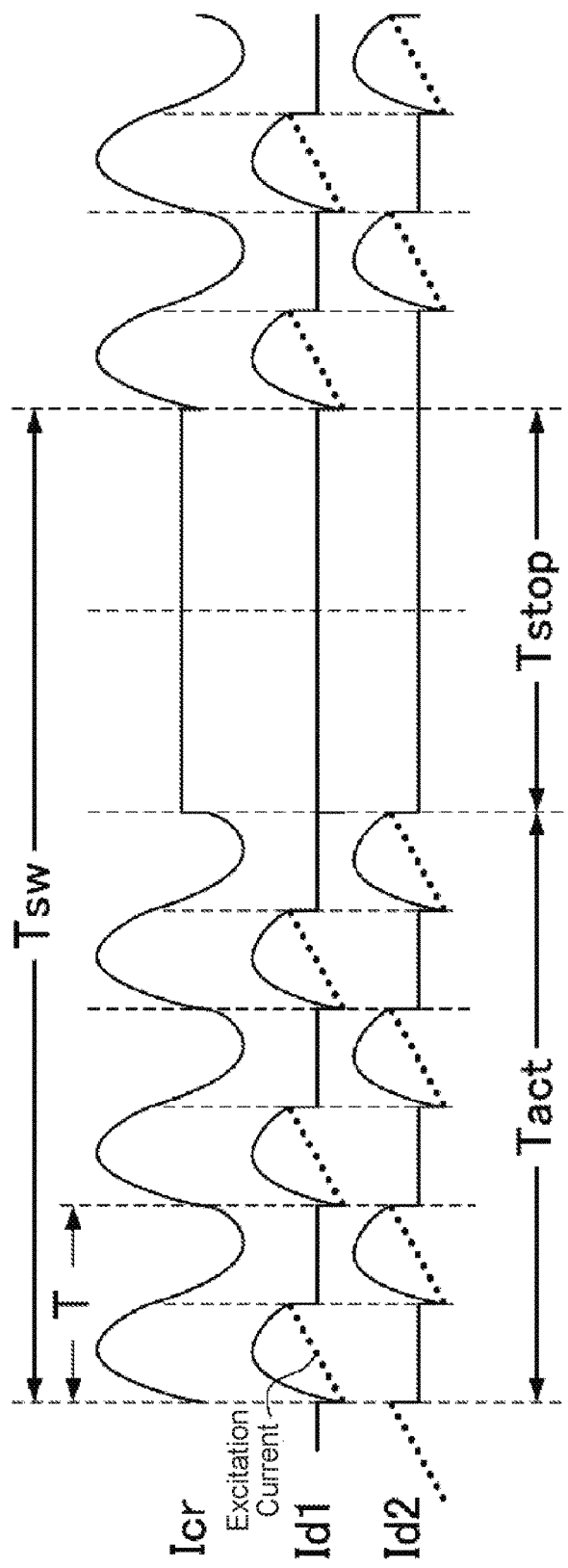
FIG. 4 is a diagram illustrating a relationship between a control unit period Tsw for a main switching element in an intermittent operation mode, a switching active period Tact for turning the main switching element on/off, and a switching stop period Tstop for stopping the on/off operations of the main switching element.

Incidentally, the operation modes have different ratios between a switching active period Tact in which the switching elements Q1 and Q2 perform switching operations and a switching stop period Tstop in which the switching operations are stopped, in a prescribed control unit period Tsw in which the on/off operations of the switching elements Q1 and Q2 are controlled in the period T (=1/fsw). FIG. 4 illustrates this concept.

Specifically, one of the stated four operation modes is an operation mode in which the switching stop period Tstop in the control unit period Tsw (=Tact+Tstop) is set to zero (0), such that the entire control unit period Tsw is set to the switching active period Tact only. The operation mode in which the switching elements Q1 and Q2 are continuously turned on/off throughout the entire control unit period Tsw in this manner is referred to here as a continuous operation mode. In the continuous operation mode, a ratio between the control unit period Tsw and the switching active period Tact, namely <Tact/Tsw>, is set to (1).

The other operation modes aside from the continuous operation mode are operation modes in which the control unit period Tsw is set so as to have different prescribed ratios between the switching active period Tact and the switching stop period Tstop. Accordingly, in this case, the switching elements Q1 and Q2 are turned on/off intermittently around the prescribed stop period, and thus this operation mode is referred to here as an intermittent operation mode.

Figure 5:
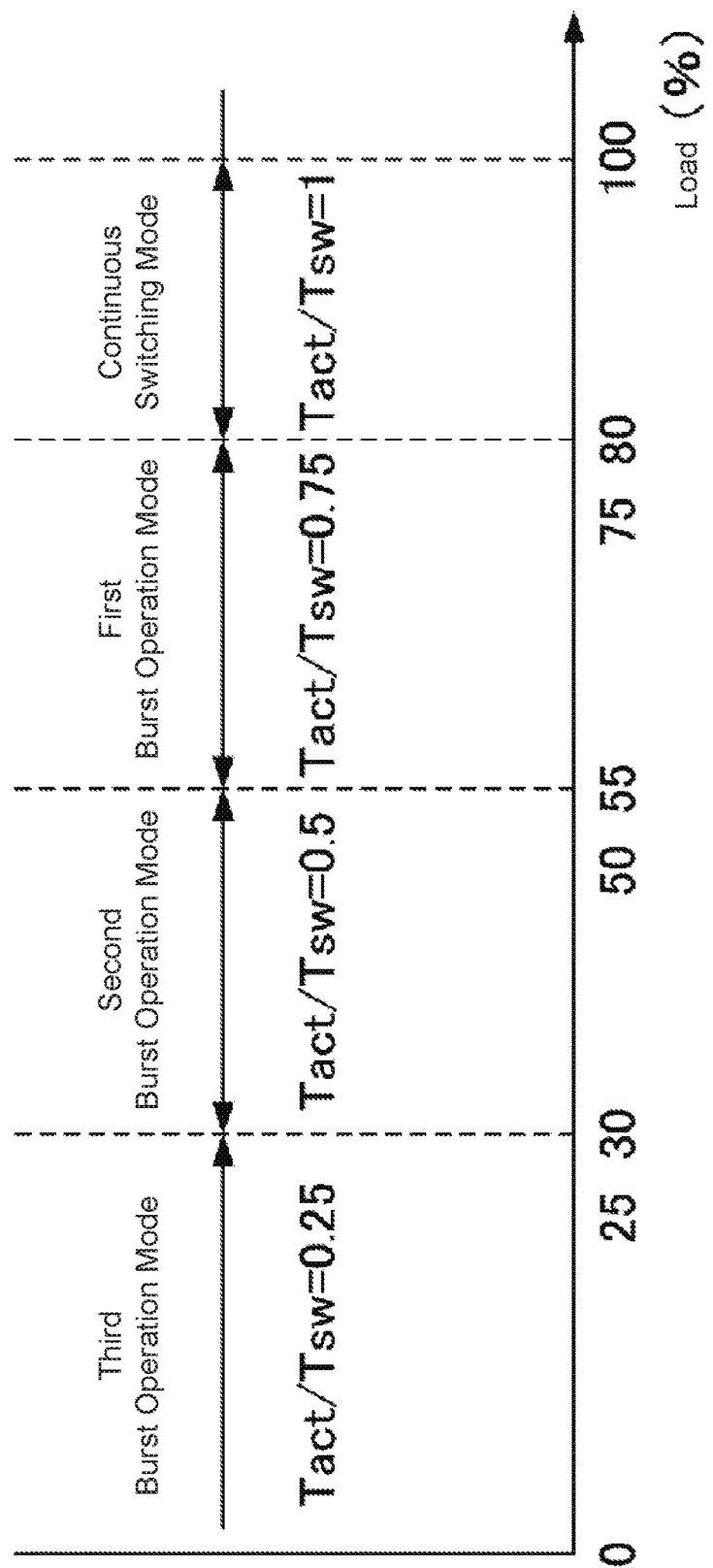
FIG. 5 is a diagram illustrating an example of operation modes set for multiple stages according to a load power.
Figure 6:
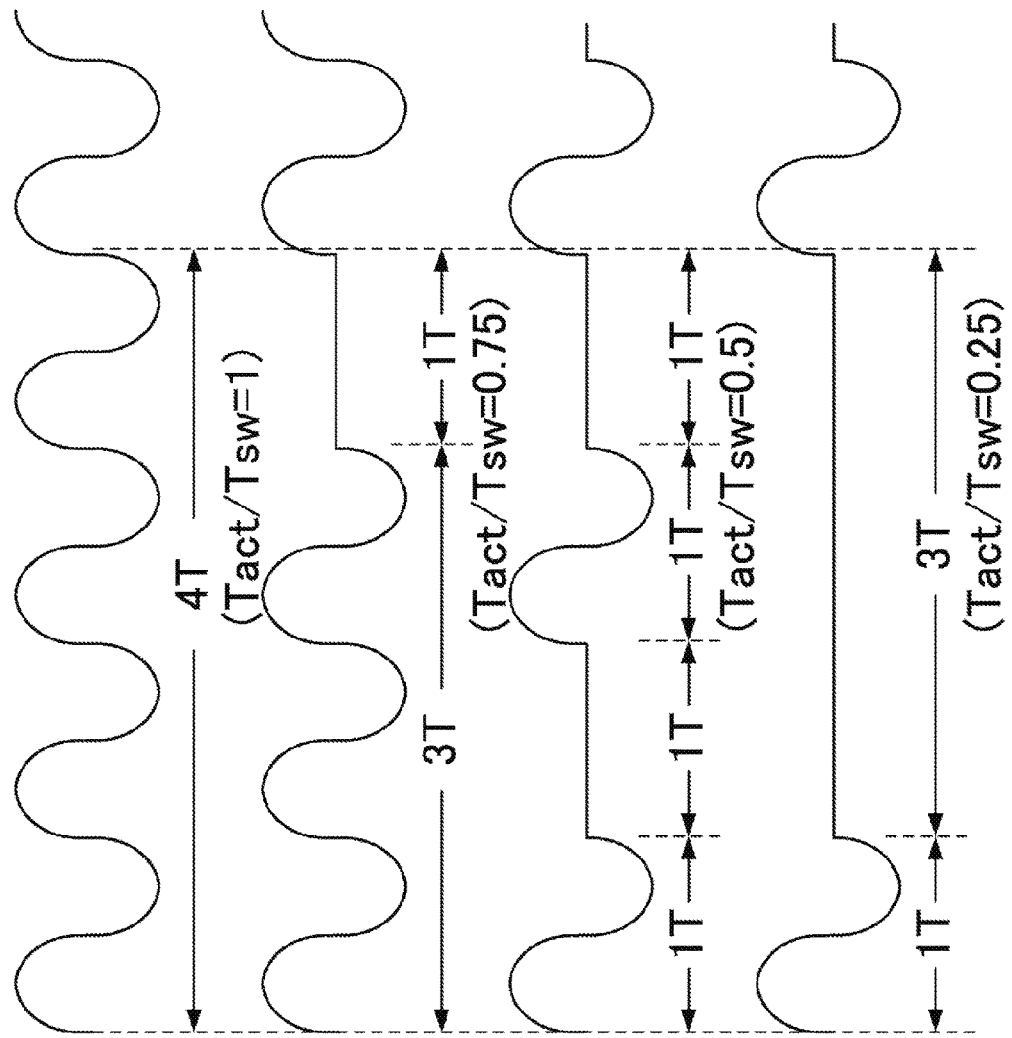
FIGS. 6A to 6D illustrate a relationship between the switching active period Tact and the switching stop period Tstop in operation modes set for multiple stages according to a load power, and a current Icr flowing in a primary coil P of a transformer T.

In this embodiment in particular, as described above, the load state of the switching power-supply device 10 is determined for four stages. In the case where the load state exceeds 80% load, it is determined that the load state is 100%, and the continuous operation mode is selected, as illustrated in FIG. 5. The continuous operation mode is an operation mode in which the switching elements Q1 and Q2 are continuously turned on/off, as illustrated in FIG. 6A, for example. In the case where the load state is less than 80% load, three types of intermittent operation modes, each having a different ratio between the switching active period Tact and the switching stop period Tstop depending on the magnitude of the load, are selected alternatively.

Specifically, in the case where the load state of the switching power-supply device 10 exceeds 55% load but does not reach 80% load, the decoder 14d determines that the load state is 75%, as described above. Then, in response to this determination result, the operation mode setting part 15 selects a first intermittent operation mode in which the ratio <Tact/Tsw> of the switching active period Tact to the control unit period Tsw is set to (0.75). The first intermittent operation mode is an operation mode in which, for example, the switching elements Q1 and Q2 are switched on/off continuously for three periods (3 T), after which the on/off operation is stopped for one period (1 T), as illustrated in FIG. 6B.

Meanwhile, in the case where the load state of the switching power-supply device 10 exceeds 30% load but does not reach 55% load, the decoder 14d determines that the load state is 50%. In this case, the operation mode setting part 15 selects a second intermittent operation mode in which the ratio <Tact/Tsw> of the switching active period Tact to the control unit period Tsw is set to (0.5). This second intermittent operation mode is an operation mode in which, for example, the on/off operation of the switching elements Q1 and Q2 and the stopping of those operations are repeated every one period (1 T), as illustrated in FIG. 6C. Note that it is also possible to repeat the on/off operation of the switching elements Q1 and Q2 and the stopping of those operations every two periods (2 T).

Furthermore, in the case where the load state of the switching power-supply device 10 does not reach 30% load, the decoder 14d determines that the load state is 25%. In this case, the operation mode setting part 15 selects a third intermittent operation mode in which the ratio <Tact/Tsw> of the switching active period Tact to the control unit period Tsw is set to (0.25). The third intermittent operation mode is an operation mode in which, for example, the switching elements Q1 and Q2 are switched on/off for one period (1 T), after which the on/off operation is stopped for three periods (3 T), as illustrated in FIG. 6D.

Here, a peak value of current Icr flowing in the primary coil P of the transformer T when the first to third intermittent operation modes are set is set to be substantially equal to the peak value of the current Icr flowing in the primary coil P of the transformer T during the continuous operation mode. That is, when an intermittent operation mode is set, conditions for the on/off operation of the switching elements Q1 and Q2 in the switching active period Tact are set to be the same as conditions when, at the rated load, the switching elements Q1 and Q2 are continuously turned on/off at a maximum efficiency η.

Figure 7:
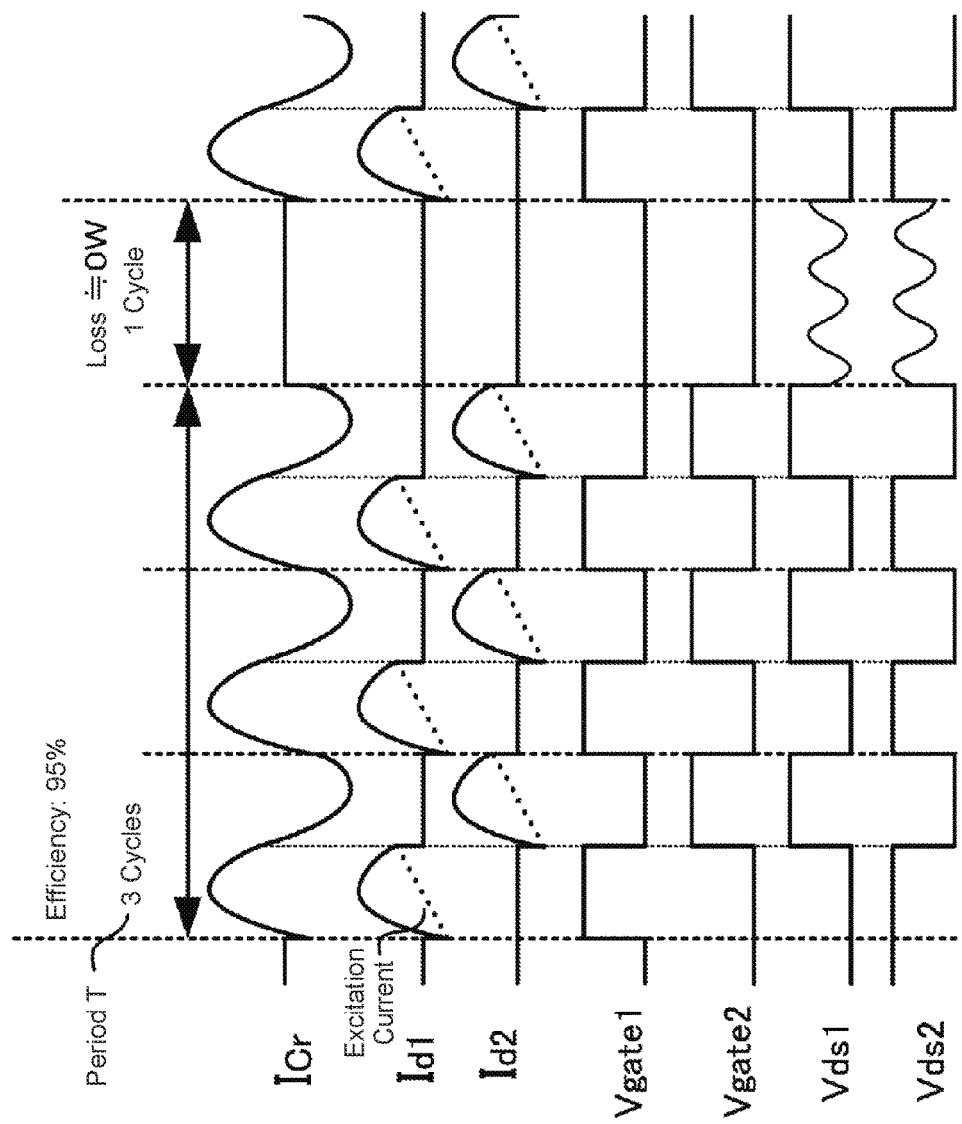
FIG. 7 is a diagram illustrating an operation waveform in the switching power-supply device illustrated in FIG. 1 at 75% load.
Figure 8:
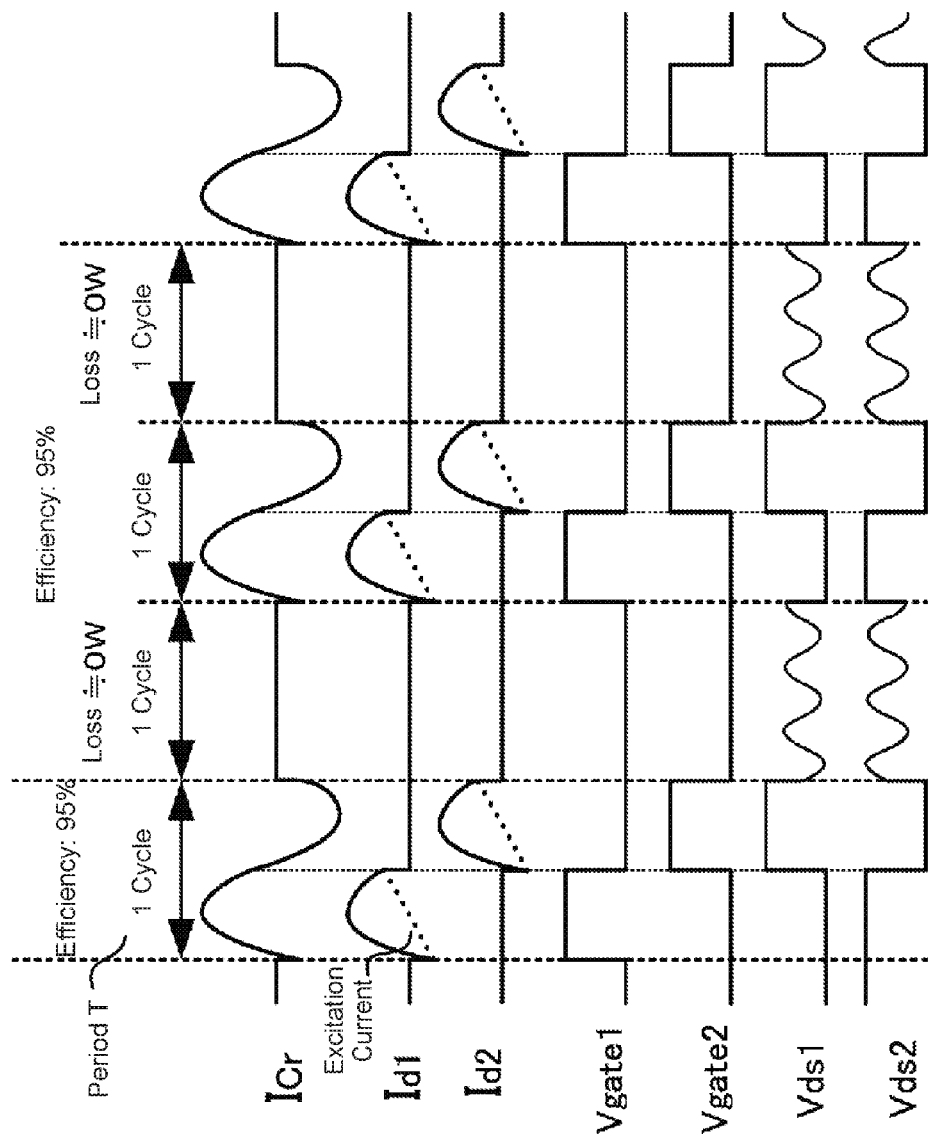
FIG. 8 is a diagram illustrating an operation waveform in the switching power-supply device illustrated in FIG. 1 at 50% load.
Figure 9:
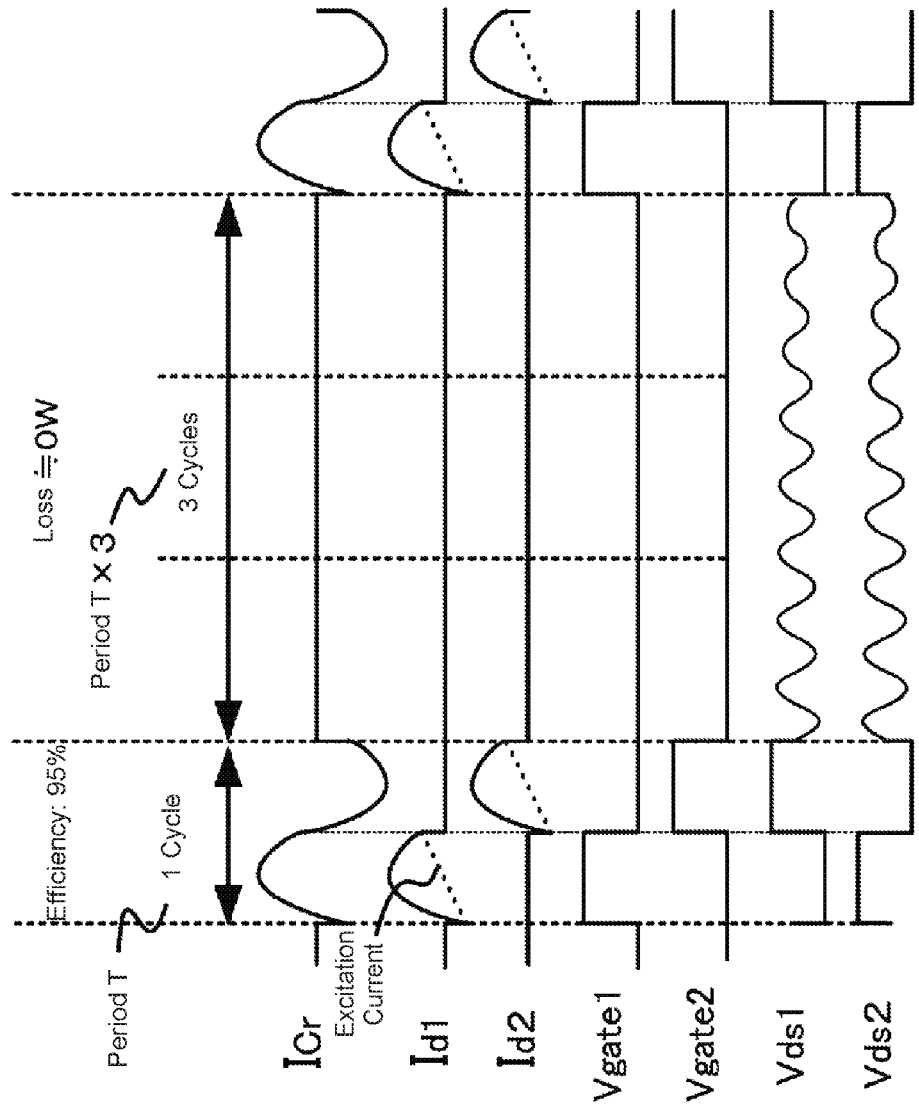
FIG. 9 is a diagram illustrating an operation waveform in the switching power-supply device illustrated in FIG. 1 at 25% load.

Accordingly, operation waveforms of the switching power-supply device 10 when the first to third intermittent operation modes are selectively set are as illustrated in FIGS. 7, 8, and 9 respectively, for example. Incidentally, FIG. 7 illustrates the operation waveforms of the switching power-supply device 10 at 75% load, FIG. 8 illustrates the operation waveforms at 50% load, and furthermore, FIG. 9 illustrates the operation waveforms at 25% load. The operation waveforms of the switching power-supply device 10 when the continuous operation mode is set are as illustrated in FIG. 15, described above.

Note that an example in which the control unit period Tsw is set to four times the switching period T of the switching elements Q1 and Q2 is described here in order to simplify the descriptions. However, the control unit period Tsw does not necessarily have to be set to an integral multiple of the period T.

Figure 10:
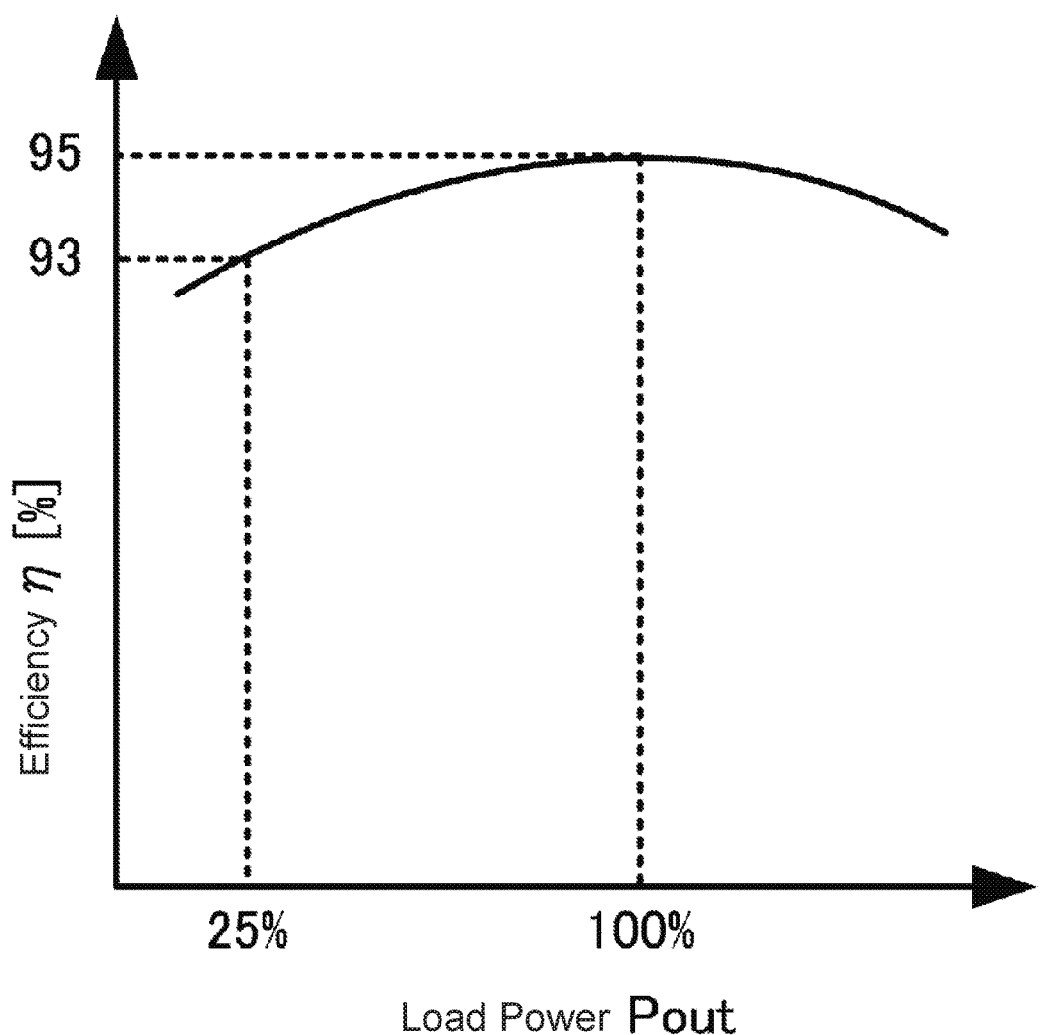
FIG. 10 is a diagram illustrating an efficiency η changing in accordance with a load state in the switching power-supply device illustrated in FIG. 1.
Figure 15:
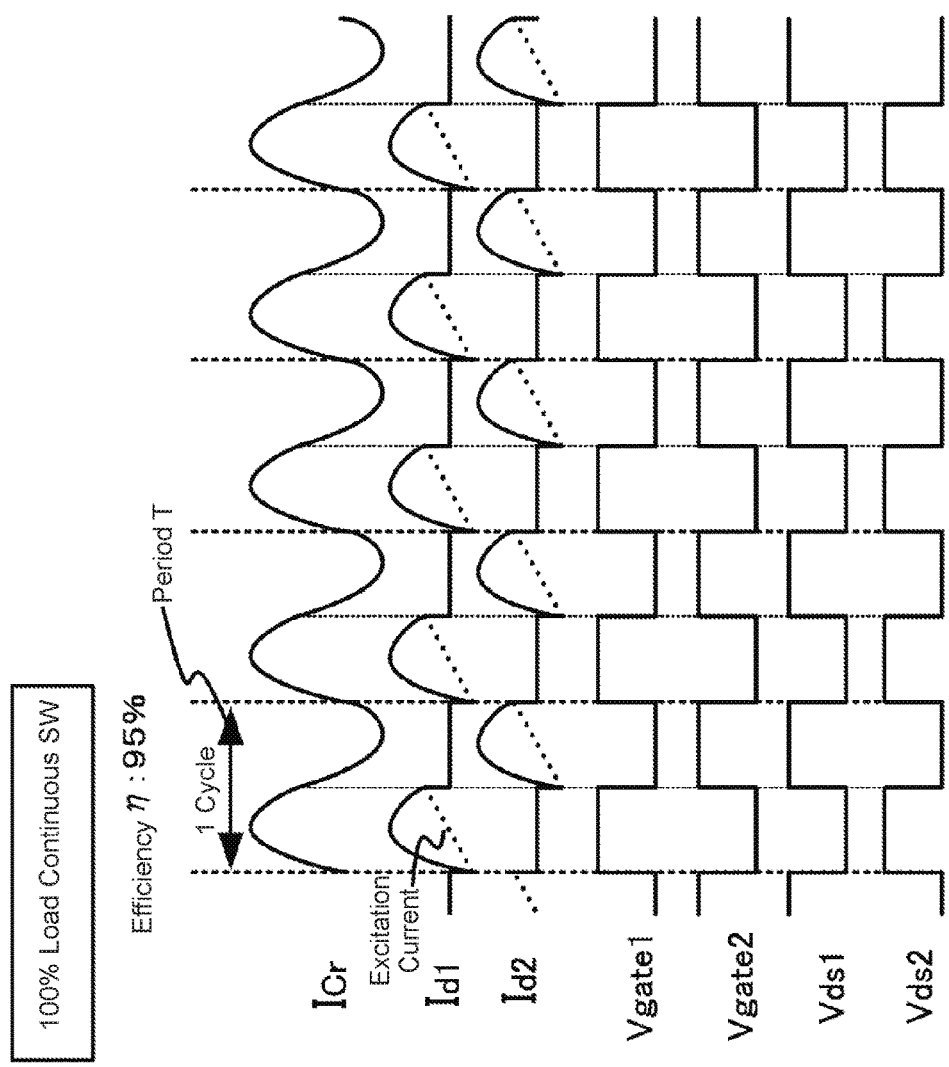
FIG. 15 is a diagram illustrating an operation waveform in the switching power-supply device illustrated in FIG. 14 at 100% load.
Figure 16:
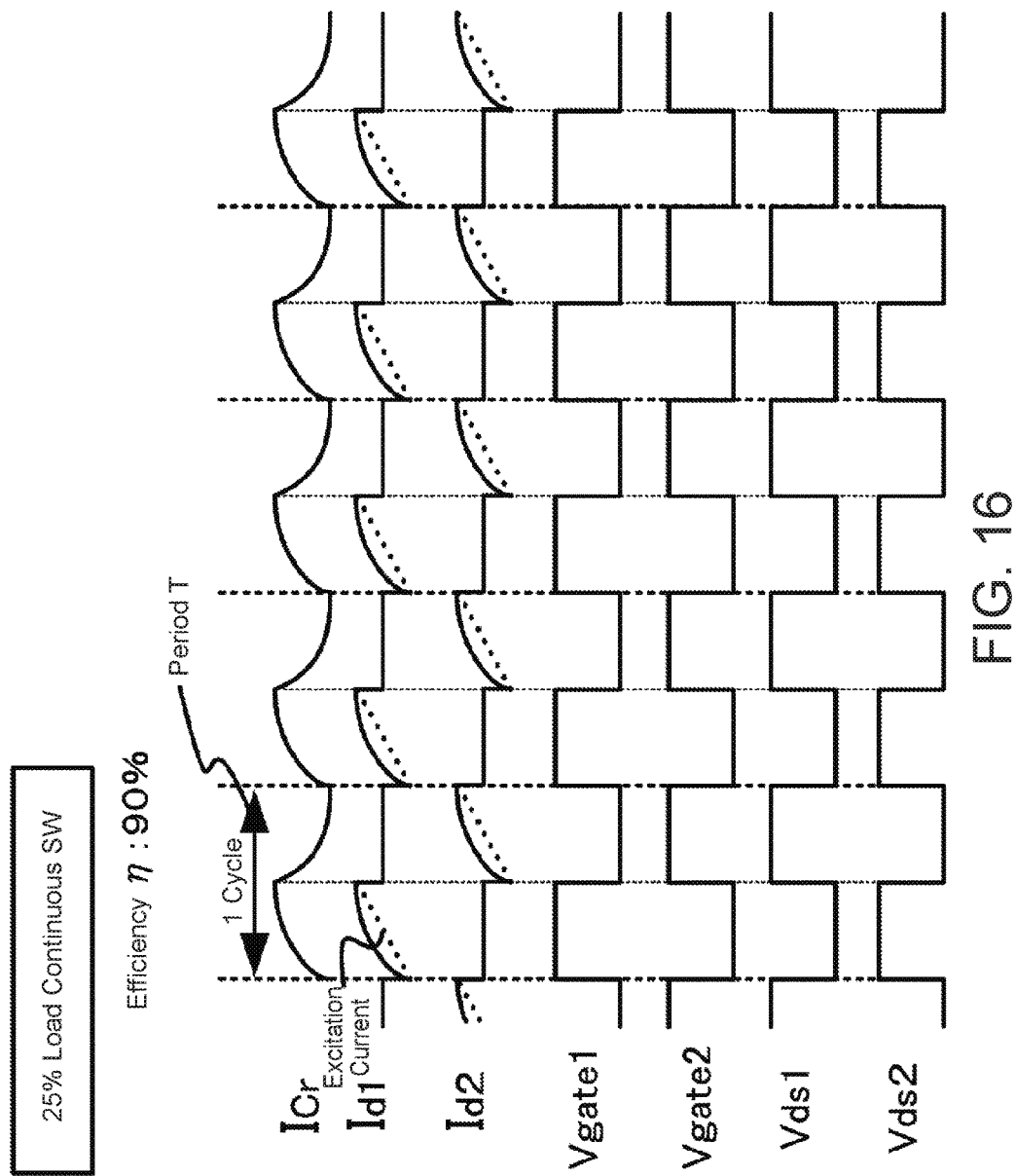
FIG. 16 is a diagram illustrating an operation waveform in the switching power-supply device illustrated in FIG. 14 at 25% load.
Figure 17:
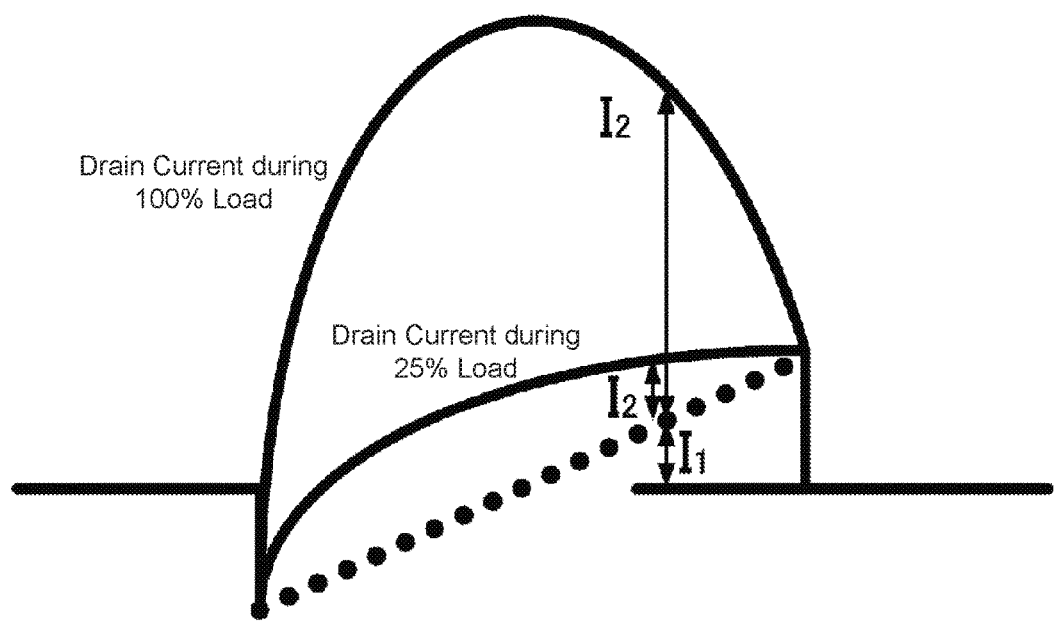
FIG. 17 is a diagram contrasting a drain current Id1 (Id2) of a switching element Q1 (Q2) at 100% load and at 25% load.
Figure 18:
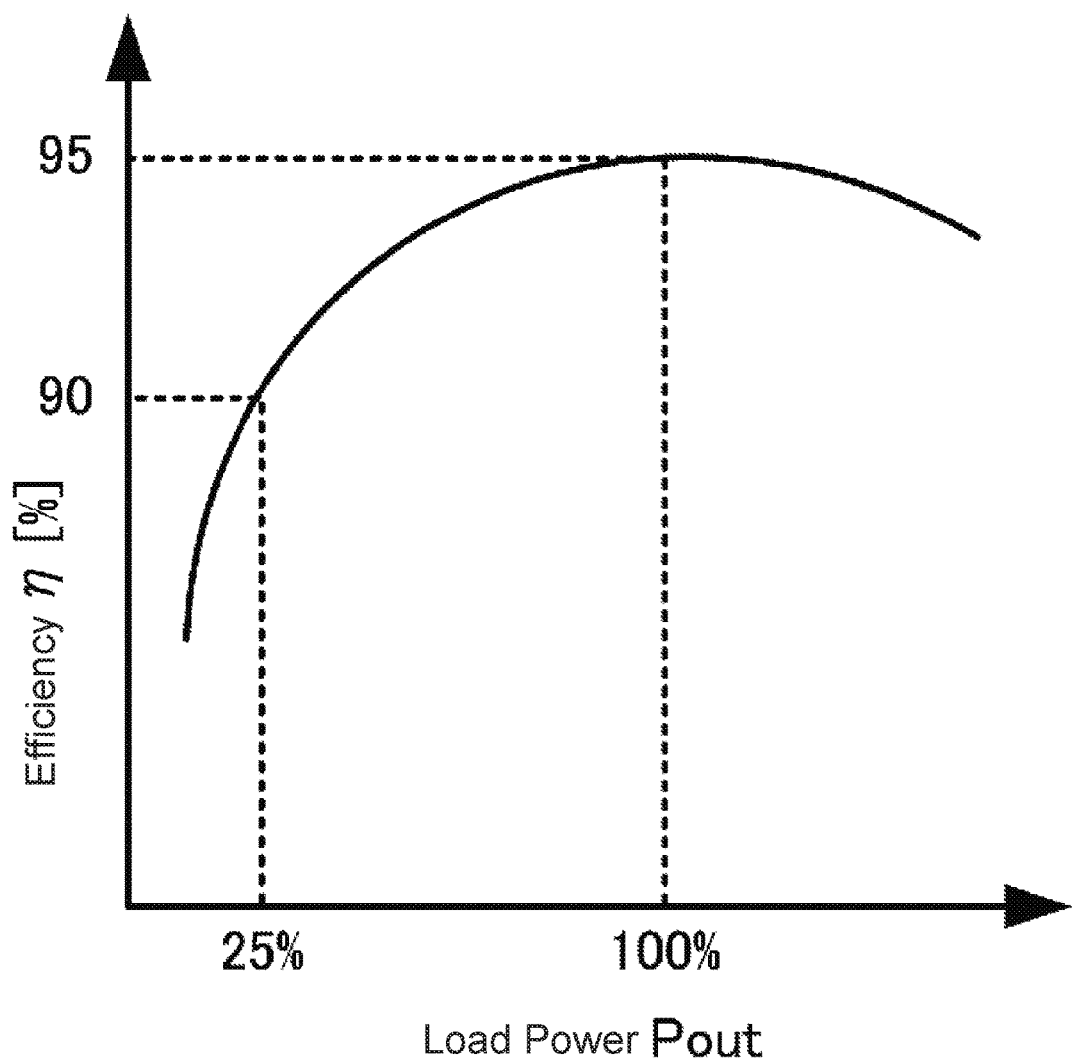
FIG. 18 is a diagram illustrating an efficiency η changing in accordance with a load state in the switching power-supply device illustrated in FIG. 14.

According to the switching power-supply device 10 configured as described above, the efficiency η in the switching active period Tact during the first to third intermittent operation modes can, as illustrated in FIGS. 7 to 9, be brought to approximately the same efficiency as the efficiency η in the continuous operation mode at the rated load illustrated in FIG. 15. Furthermore, loss in the switching stop period Tstop during the intermittent operation mode can be brought to substantially zero (0). As such, the efficiency η of the switching power-supply device 10 according to the present invention can be made substantially equal to a maximum efficiency obtained as a time average, regardless of which of the above-described operation modes is being used. An effect such as being able to prevent a major drop in the efficiency particularly at light loads, can thus be achieved throughout a wide range, from light load states to a maximum load state, as illustrated in FIG. 10, for example.

Additionally, the switching power-supply device 10 detects both the DC input voltage Vin and the input current Iin of the switching power-supply device 10 internally, as described above; finds the input power Pin; and takes the input power Pin as the evaluation information for determining the load state. The load state of the switching power-supply device 10 is then determined by comparing the control voltage Vp indicating the input power Pin with the prescribed threshold voltages Vth1, Vth2, and Vth3.

Thus according to the switching power-supply device 10, a plurality of operation modes based on the load state can be set in advance with conditions that do not cause a drop in the efficiency η, and one of the plurality of operation modes can be selectively set in accordance with the load state detected from the input power Pin. As such, it is possible to construct the switching power-supply device 10 that with a simple configuration is capable of preventing a major drop in the efficiency η across a wide range of load conditions, from the rated load to light loads, without a major increase in the number of constituent components.

Meanwhile, it goes without saying that the present invention can be applied not only in the above-described current resonance-type switching power-supply device 10, but also in a voltage resonance-type switching power-supply device, which is not specifically illustrated, in the same manner. The present invention can be similarly applied in forward-type and flyback-type switching power-supply devices.

Figure 11:
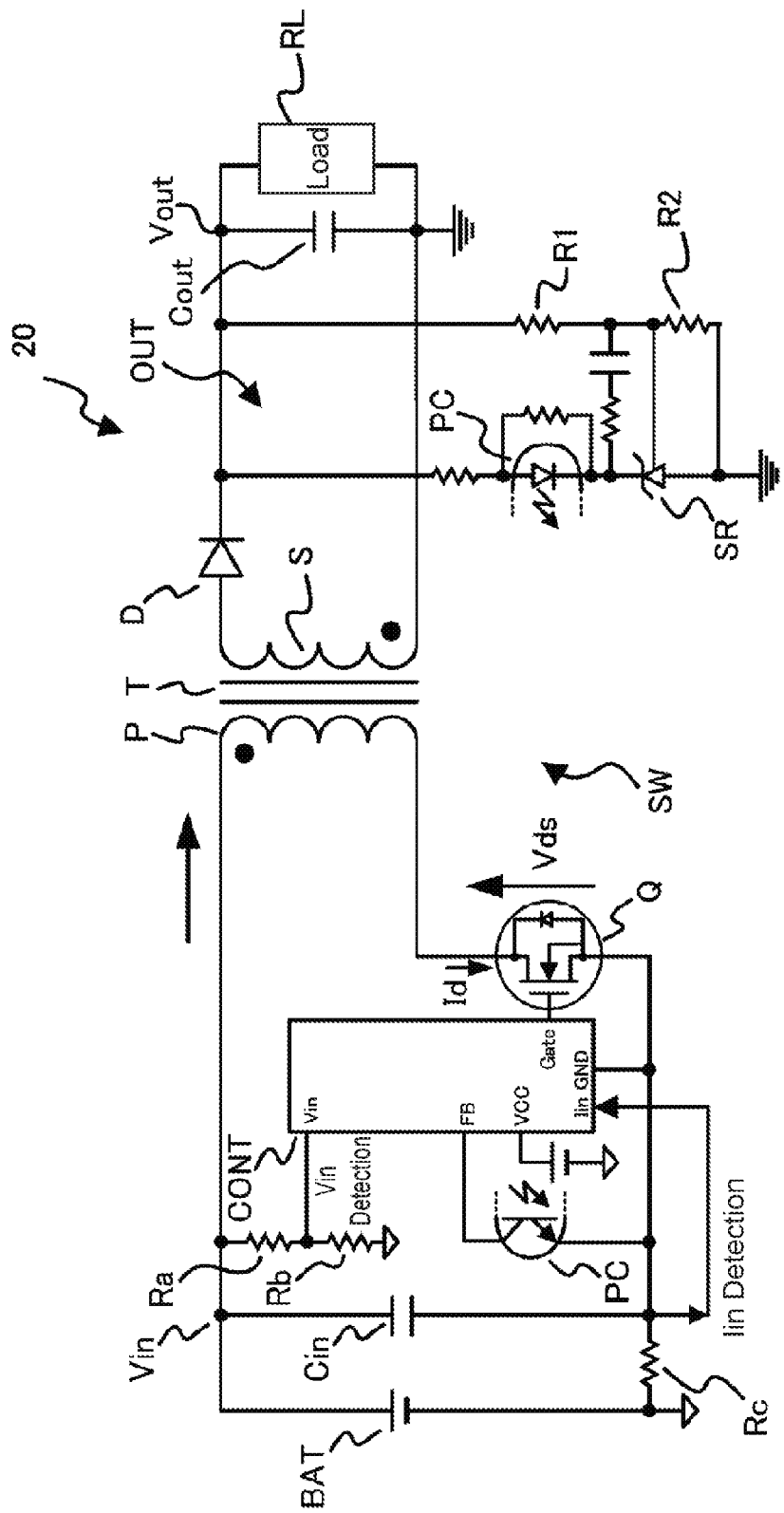
FIG. 11 is an overall schematic diagram illustrating a flyback-type switching power-supply device according to Embodiment 2 of the present invention.

FIG. 11 is a diagram illustrating the overall configuration of a flyback-type switching power-supply device 20 according to Embodiment 2 of the present invention. The switching power-supply device 20 basically includes a switching element Q connected to the DC power source BAT via to the primary coil P of the transformer T in series, and a diode D connected in series to a secondary coil S of the transformer T. When the switching element Q is ON, the switching power-supply device 20 supplies current to the primary coil P of the transformer T to store energy, and when the switching element Q is OFF, the switching power-supply device 20 obtains a voltage induced in the secondary coil S of the transformer T through the diode D so as to generate a prescribed DC output voltage Vout.

The switching control circuit CONT in the flyback-type switching power-supply device 20 illustrated in FIG. 11 serves to turn the switching element Q on/off at a prescribed duty cycle. At the same time, the switching control circuit CONT is configured to make the DC output voltage Vout constant according to the feedback signal found in accordance with the DC output voltage Vout.

Figure 12:
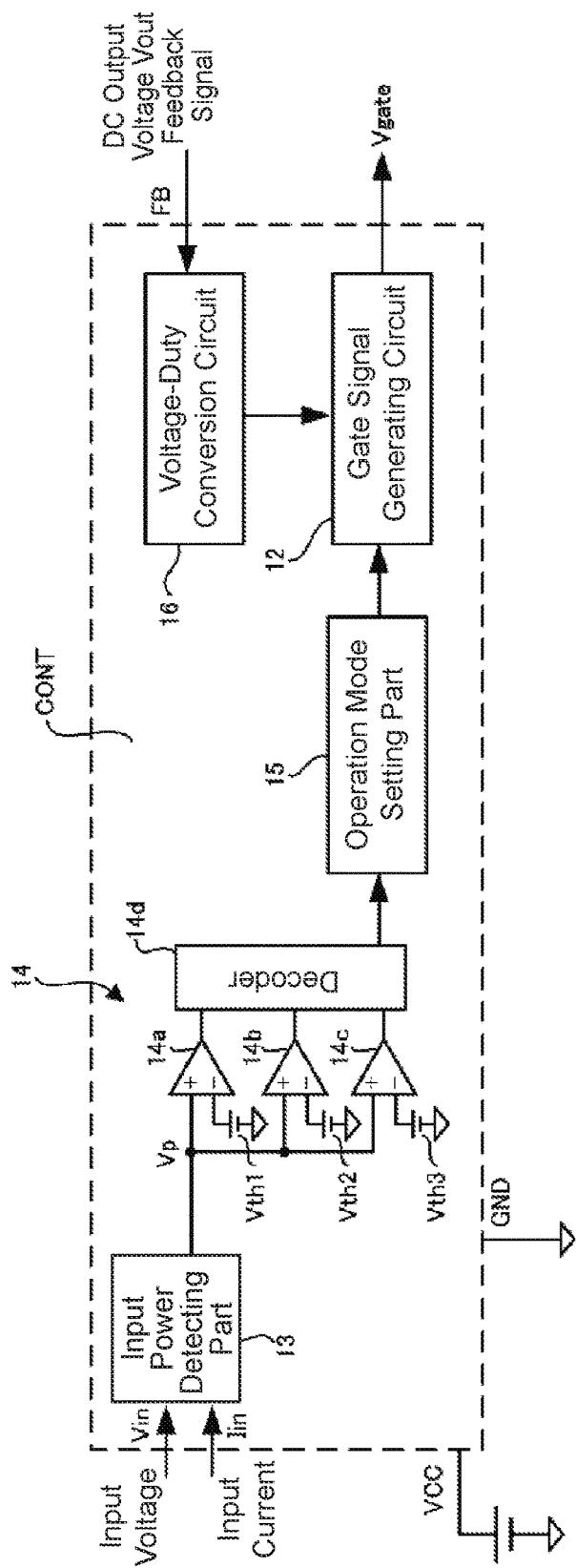
FIG. 12 is a schematic block diagram illustrating main parts of a switching control circuit in the switching power-supply device illustrated in FIG. 11.

Specifically, as illustrated in the schematic diagram of FIG. 12, for example, the switching control circuit CONT in the switching power-supply device 20 may include a voltage-duty conversion circuit 16 that finds a duty cycle based on a voltage of the feedback signal, instead of the voltage-frequency conversion circuit 11 described earlier in Embodiment 1. As such, the gate signal generating circuit 12 is configured to generate a gate signal Vgate that turns the switching element Q on/off on the basis of the duty cycle set by the voltage-duty conversion circuit 16.

Incidentally, the duty cycle determines a percentage of an on period or an off period in one period T in which the switching element Q is turned on/off. The amount of energy transmitted to the secondary coil S side of the transformer T is controlled by carrying out feedback control on the duty cycle in accordance with changes in the DC output voltage Vout, which as a result makes the DC output voltage Vout constant.

Basically, in the switching power supply device configured as described above, a feature of the switching power-supply device 20 according to Embodiment 2 is that, like the switching power-supply device 10 according to Embodiment 1 described earlier, the switching power-supply device 20 includes the input voltage detecting unit VD that detects the DC input voltage Vin and the input current detecting unit ID that detects the input current Iin. The input voltage detecting unit VD according to this embodiment is also constituted of, for example, the resistors Ra and Rb connected in series, and is realized as a resistance voltage division circuit that detects the DC input voltage Vin through resistance division. The input current detecting unit ID, meanwhile, is realized as, for example, the shunt resistor Rc for detecting current, connected in series to a source of the switching element Q.

Furthermore, the switching control circuit CONT of the switching power-supply device 20 is provided with the input power detecting part 13, the load state determination unit 14, and the operation mode setting part 15, in the same manner as in Embodiment 1. The configurations and roles of the input power detecting part 13, the load state determination unit 14, and the operation mode setting part 15 are the same as in Embodiment 1, and thus descriptions thereof will be omitted here.

Figure 13:
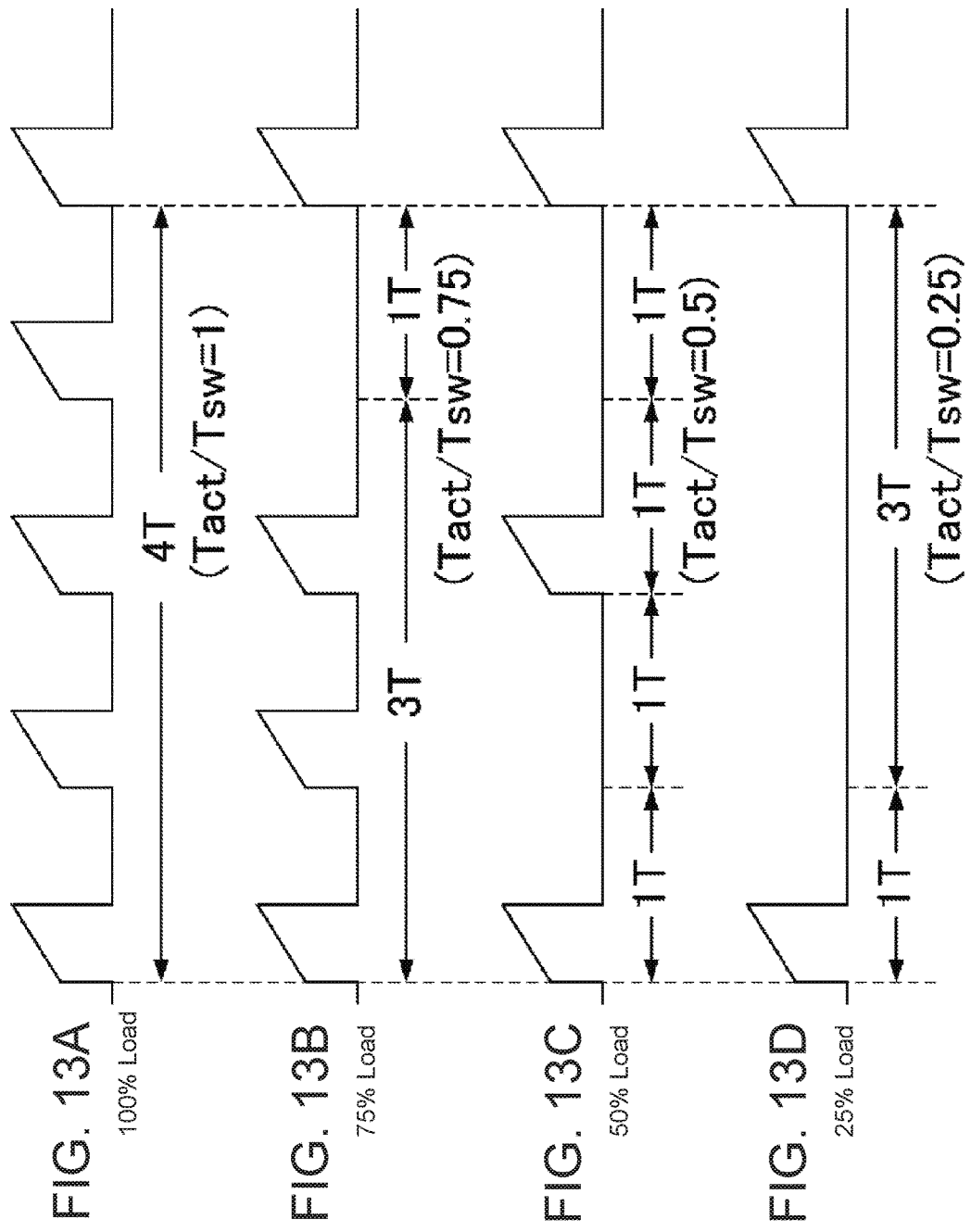
FIGS. 13A to 13D illustrate a relationship between the switching active period Tact and the switching stop period Tstop in operation modes set for multiple stages according to a load power, and a drain current Id flowing in a main switching element.

FIGS. 13A to D illustrate operation waveforms based on load states in the switching power-supply device 20 configured as described above, and specifically illustrate a drain current Id flowing in the switching element Q. In the switching power-supply device 20 according to Embodiment 2 too, the continuous operation mode is set when the load is 100%, and as illustrated in FIG. 13A, the switching element Q is continuously turned on/off at a constant period T. Meanwhile, when the load is 75%, the first intermittent operation mode is set, and as illustrated in FIG. 13B, the switching element Q is turned on/off for three periods (3 T), after which the on/off operations are stopped for one period (1 T).

Furthermore, when the load is 50%, the second intermittent operation mode is set, and as illustrated in FIG. 13C, the switching element Q is turned on/off, and the on/off operations are stopped, repeatedly every one period (1 T). Finally, when the load is 25%, the third intermittent operation mode is set, and as illustrated in FIG. 13D, the switching element Q is turned on/off for one period (1T), after which the on/off operations are stopped for three periods (3 T). Accordingly, a drop in the efficiency η at light loads can be effectively suppressed in the flyback-type switching power-supply device 20 according to Embodiment 2 too, in the same manner as with the switching power-supply device 10 according to the above-described Embodiment 1.

Note that the present invention is not limited to the embodiments described thus far. For example, in the above embodiments, the conditions defining the first to third intermittent operation modes are set by focusing on the ratio <Tact/Tsw> of the switching active period Tact to the control unit period Tsw. However, in the case where the control unit period Tsw is defined in advance, the switching stop period Tstop is found as a period excluding the switching active period Tact in the control unit period Tsw, namely <Tsw−Tact>. Thus it is of course possible to set the conditions defining the first to third intermittent operation modes by focusing on a ratio <Tstop/Tsw> of the switching stop period Tstop to the control unit period Tsw.

Furthermore, it is of course possible to directly set the conditions defining the first to third intermittent operation modes as the ratio between the switching active period Tact and the switching stop period Tstop. It goes without saying that it is not necessary to set the ratio between the switching active period Tact and the switching stop period Tstop as a ratio of whole number. The present invention can be widely applied in various types of switching power-supply devices without departing from the essential spirit thereof. Furthermore, in all of these systems, forming the main switching element, some of the elements that rectify the voltage induced in the secondary-side coil, or all thereof from wide band-gap semiconductors in order to reduce switching loss as described above is also useful for improving the efficiency.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power-supply device, comprising:
a switching power-supply main unit that receives a DC input voltage from a DC source and converts said DC input voltage to a DC output voltage, the switching power-supply main unit including: a transformer having a primary coil and a secondary coil; a main switching element that controls a current flowing in the primary coil of the transformer; and a voltage output circuit that generates a DC output voltage by rectifying a voltage induced in the secondary coil of said transformer; and
a switching control circuit that receives a feedback signal representing said DC output voltage and controls a switching operation of said main switching element so as to feedback-control said DC output voltage to be a prescribed constant voltage,
wherein said switching control circuit includes:
an input power detecting part that detects an input power to said switching power-supply main unit by detecting said DC input voltage and a DC input current flowing from the DC source to said switching power-supply main unit; and
an operation mode setting part that determines whether a burst mode operation of said main switching element or a continuous mode operation of said main switching element is to be performed based on the input power detected by the input power detecting part, wherein the burst mode operation has a switching active period during which said main switching element is repeatedly turned on and off and a switching stop period during which said main switching element is not turned on and off, the switching active period and the switching stop period alternating and repeating at a prescribed frequency, and wherein, in said continuous mode operation, said main switching element is repeatedly turned on and off without having the switching stop period.

2. The switching power-supply device according to claim 1, wherein when said operation mode setting part determines that the burst mode operation is to be performed, said operation mode setting part further determines a ratio of said switching active period to said switching stop period in accordance with the input power detected by the input power detecting part.

3. The switching power-supply device according to claim 2, wherein said operation mode setting part sets the continuous mode operation when said detected input power is a prescribed maximum power, and, as said detected input power decreases from the prescribed maximum power, sets the burst mode operation such that said ratio decreases from 100%.

4. The switching power-supply device according to claim 3, wherein said operation mode setting part sets said ratio of said switching active period to said switching stop period to decrease in a stepwise manner as said detected input power decreases.

5. The switching power-supply device according to claim 1, wherein said switching control circuit controls the switching operation of said main switching element such that a peak value of the current flowing in the primary coil of said transformer in the burst mode operation is set to be approximately equal to a peak value of the current flowing in the primary coil of said transformer in the continuous mode operation.

6. The switching power-supply device according to claim 5, wherein said switching control circuit controls the switching operation of said main switching element such that in the burst mode operation, the peak value of the current flowing in the primary coil of said transformer is a current value at which an efficiency of said switching power-supply main unit generating and outputting said DC output voltage from said DC input voltage is maximum.

7. The switching power-supply device according to claim 1, wherein, in the continuous mode operation and in the switching active period of the burst mode operation, said switching control circuit controls a frequency at which said main switching element is repeatedly turned on and off based on the feedback signal, and wherein said switching power-supply main unit and said switching control circuit form a current resonance-type switching power-supply circuit.

8. The switching power-supply device according to claim 1, wherein, in the continuous mode operation and in the switching active period of the burst mode operation, said switching control circuit controls a frequency at which said main switching element is repeatedly turned on and off based on the feedback signal, and wherein said switching power-supply main unit and said switching control circuit form a voltage resonance-type switching power-supply circuit.

9. The switching power-supply device according to claim 1, wherein, in the continuous mode operation and in the switching active period of the burst mode operation, said switching control circuit controls a duty cycle at which said main switching element is repeatedly turned on and off based on the feedback signal, and wherein said switching power-supply main unit and said switching control circuit form a forward-type switching power-supply circuit.

10. The switching power-supply device according to claim 1, wherein, in the continuous mode operation and in the switching active period of the burst mode operation, said switching control circuit controls a duty cycle at which said main switching element is repeatedly turned on and off based on the feedback signal, and wherein said switching power-supply main unit and said switching control circuit form a flyback-type switching power-supply circuit.

11. The switching power-supply device according to claim 1, wherein at least some of said main switching element and elements in the voltage output circuit that rectify the voltage induced in said secondary coil are wide band-gap semiconductor elements.

12. The switching power-supply device according to claim 11, wherein said wide band-gap semiconductors are silicon carbide, a gallium nitride-based material, a gallium oxide-based material, or diamond.

\* \* \* \* \*